United States Patent
Cole et al.

(10) Patent No.: US 8,820,286 B2
(45) Date of Patent: Sep. 2, 2014

(54) LIGHTWEIGHT PORTABLE ELECTRIC GENERATOR WITH INTEGRATED STARTER/ALTERNATOR

(75) Inventors: Gregory S. Cole, Melbourne, FL (US); Brian E. Tews, Melbourne, FL (US); Robert P. Scaringe, Rockledge, FL (US); Robert Paul Roth, Melbourne, FL (US); Daniel Mason, Melbourne, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 0 days.

(21) Appl. No.: 11/738,569

(22) Filed: Apr. 23, 2007

(65) Prior Publication Data
US 2007/0227470 A1 Oct. 4, 2007

Related U.S. Application Data

(63) Continuation-in-part of application No. 10/649,793, filed on Aug. 28, 2003, now abandoned.

(51) Int. Cl.
| | |
|---|---|
| *F02N 11/08* | (2006.01) |
| *H02K 1/27* | (2006.01) |
| *H02K 11/04* | (2006.01) |
| *H02K 9/06* | (2006.01) |
| H02K 7/18 | (2006.01) |
| F02B 63/04 | (2006.01) |
| F01M 11/00 | (2006.01) |
| F01P 1/06 | (2006.01) |
| F01P 1/02 | (2006.01) |

(52) U.S. Cl.
CPC ............ *H02K 1/2786* (2013.01); *H02K 7/1815* (2013.01); *F02B 63/04* (2013.01); *F01M 11/0004* (2013.01); *F05C 2201/028* (2013.01); *F01P 1/06* (2013.01); *F01P 1/02* (2013.01); *H02K 11/048* (2013.01); *H02K 9/06* (2013.01)
USPC .................... 123/179.28; 123/179.3

(58) Field of Classification Search
USPC ..... 123/179.28, 179.1, 179.25; 290/1 A, 1 B, 290/14, 16, 18, 19, 22, 27, 28, 36 R, 38 R, 290/47, 48; 180/65.1, 65.21, 65.22, 65.225, 180/65.24, 65.245, 65.25, 65.26, 65.265, 180/65.27, 65.275, 65.28, 65.285, 65.29, 180/65.31, 65.51, 65.6, 65.7, 65.8; 701/22, 701/113
See application file for complete search history.

(56) References Cited

U.S. PATENT DOCUMENTS

| | | | | |
|---|---|---|---|---|
| 1,924,462 | A | * | 8/1933 | Scofield ................. 290/1 B |
| 4,835,405 | A | * | 5/1989 | Clancey et al. ............ 290/1 A |
| 4,926,108 | A | * | 5/1990 | Schooley et al. ............ 322/15 |
| 6,420,793 | B1 | * | 7/2002 | Gale et al. ................. 290/34 |
| 6,484,596 | B2 | * | 11/2002 | Puchas ......................... 74/6 |
| 6,718,927 | B2 | * | 4/2004 | Goetze et al. ............ 123/179.3 |

(Continued)

*Primary Examiner* — Mahmoud Gimie
*Assistant Examiner* — Sizo Vilakazi

(57) ABSTRACT

A compact and lightweight electric generator for portable power applications employs a new engine design and integration approach for reducing engine, generator, and starter weight. A unique flywheel alternator/starter configuration that generates electrical power, rotates the engine for starting, provides inertia for smooth engine operation, pressurized air for cooling, and inertia for the alternator. An engine cowling provides rotating component protection, a fan shroud mechanism, cooling air ducts, and a cooling mechanism for handling large quantities of heat produced by rectified power conversion. An electrical hook up that allows the generator to provide transient surge capacity for starting inductive loads, or improved load leveling and fuel efficiency.

16 Claims, 9 Drawing Sheets

(56) References Cited

U.S. PATENT DOCUMENTS

| | | | |
|---|---|---|---|
| 6,727,599 B2* | 4/2004 | Schlangen | 290/40 B |
| 7,108,095 B1* | 9/2006 | Washington et al. | 180/165 |
| 2002/0079149 A1* | 6/2002 | Kotre et al. | 180/65.3 |
| 2003/0088343 A1* | 5/2003 | Ochiai et al. | 701/22 |
| 2004/0021320 A1* | 2/2004 | Yamada et al. | 290/1 B |
| 2004/0112320 A1* | 6/2004 | Bolz et al. | 123/179.28 |
| 2005/0109550 A1* | 5/2005 | Buglione et al. | 180/65.2 |
| 2006/0170218 A1* | 8/2006 | Grant et al. | 290/1 R |
| 2007/0157899 A1* | 7/2007 | Seufert et al. | 123/179.25 |

* cited by examiner

LIGHTWEIGHT PORTABLE ELECTRIC GENERATOR WITH INTEGRATED STARTER/ALTERNATOR

RELATED APPLICATIONS

This application is a continuation-in-part of U.S. application Ser. No. 10/649,793, filed Aug. 28, 2003.

BACKGROUND OF THE INVENTION

1. Field of the Invention

The present invention relates to electrical generators, particularly, to size, weight, and reliability improvements of portable electric generators. A flywheel starter/alternator mounted on an air-cooled or water-cooled internal combustion engine generates electrical power when the engine is operating and can also be used to provide engine rotation for starting. The electrical configuration provides improved power surge capability and load leveling capability. Improvements in the engine design and the functionality of the integrated flywheel-alternator-starter result in a smaller and lighter generator with fewer components that is easier to transport, more reliable, and may be started in colder ambient conditions.

2. Description of the Related Art

Portable electric generators of the prior art are typically comprised of an air-cooled internal combustion engine coupled mechanically through a power takeoff shaft to an alternator. The power takeoff shaft is typically integral to the crankshaft on the side of the engine opposed to the engine flywheel, although power takeoff shafts integral to the camshaft on the side of the engine opposed to the engine flywheel are also common. The flywheel provides an inertial means of reducing shaft speed fluctuations that are created by the cyclic torque of reciprocating machines. In this configuration the alternator has its own set of bearings for supporting the alternator rotor, which is coupled to the power takeoff shaft through a flexible or rigid coupling. The alternator assembly is mounted on a frame common with the engine. To provide electric starting, an electric starter motor is typically mounted to the external surface of the engine and temporarily engages with the flywheel during the starting.

Typically, the end of the electric starter motor connects to a retractable pinion gear, such as a Bendix gear, which engages teeth on the engine flywheel, during motor starting, cranking the engine. Once the combustions cycle is self-sustaining, this pinion gear retracts, disengaging the Bendix gear from the teeth on the flywheel. Variations of engaging a starter motor to the engine for starting are also possible and well known in the art. Using a separate alternator coupled to the engine via the protruding crankshaft and a dedicated starter motor mounted on the engine and temporarily coupled to the engine through gear teeth (ring gear) on the flywheel is typically bulky and heavy due to lack of weight optimization and integration. Furthermore, alternator coupling failures due to misalignment and failure of the starter motor to engage or disengage, as well as gear wear can reduce the reliability of this type of system. Examples of such prior art generators include 2-kW Military Tactical Generator Sets (MTGs) by Dewey Electronics Corporation and Mechron Power Systems, Inc. The 2-kW, 120-VAC, 60-Hz Dewey MTG (model No. MEP 531A) has a dry weight of 143.1 lbs. and is comprised of a commercial alternator mounted to a Yanmar L48AE-DEG engine. The Yanmar engine has an externally mounted starter motor with a solenoid-actuated pinion gear to engage the ring gear mounted on the flywheel. The 2-kW, 28-VDC Dewey MTG (model No. MEP501A) has a dry weight of 123.5 lbs. and is comprised of a Balmar alternator mounted to the same Yanmar L48AE-DEG engine. The AC and DC versions of the Mechron 2-kW MTGs are also comprised of a commercial alternator mounted to the Yanmar L48AE-DEG engine and have dry weights of 141 lbs. and 126 lbs., respectively. In another common configuration, the alternator rotor is mounted directly on the power takeoff shaft and the alternator stator is fixed to the engine housing or engine block. The independent alternator shaft, bearings, bearing housing, and coupling of the first configuration are eliminated. This type of generator is typically assembled from a commercially available engine and an alternator designed specifically for the engine power takeoff shaft. While this configuration provides a size and weight improvement over the first configuration, full optimization and complete integration is still lacking. A separate externally mounted starter motor with an engage-able/dis-engage-able pinion gear rotating a ring gear on the flywheel is also still used. An example of such prior art includes Polar Power Inc. alternator model 3500 or 6250 mounted to commercial generators such as Yanmar's L40, L48, L70, or Lister Potter LPA2 engines. The dry weight of a Polar 35000 alternator mounted on a Yanmar L48AE-DE engine is 91 lbs. (not including instrumentation and generator frame).

Additional size and weight reductions can be achieved when the engine manufacturer is the same as the alternator manufacturer, or the manufacturer of the engine and the manufacturer of the alternator work in unison during the design phase to produce a system. Designing the engine and alternator simultaneously results in an optimized system, not just a system consisting of individually optimized components. The largest components of an electric generator are typically the engine block, the alternator, and the starter motor assembly. Therefore, the present invention is aimed at reducing the size and weight of these components through integration of the components and their functions.

Throughout the twentieth century, the majority of engine blocks were manufactured from cast iron. Lightweight alloys, primarily aluminum, replaced cast iron in mobile applications (automotive engines, marine engines, generator set engines, etc.). In the 1990s, with the impetus to reduce engine emissions, major automotive engine manufacturers turned to even lighter weight alloys such as magnesium to reduce engine weight, thereby reducing automobile weight, reducing power requirements, and reducing emissions. Magnesium alloys are approximately 33% less dense than aluminum and 75% less dense than cast iron. Therefore, when designing a new engine for mobile electric power generation, from a weight optimization perspective, magnesium alloys are considered the most desirable, aluminum alloys the second most desirable, and cast iron the least desirable. Of the magnesium alloys, magnesium-aluminum (AM) and magnesium-aluminum-zinc (AZ) alloys have excellent room temperature strength and/or ductility but do not exhibit good creep resistance. AZ alloys have good corrosion resistance properties as well. Magnesium-aluminum-rare earth (AE) and magnesium-aluminum-silicon (AS) have been developed to improve elevated-temperature performance. AS alloys only provide a marginal improvement in creep resistance. AE alloys are expensive due to rare-earth additions, have poor die cast properties, have high oxidation rate, and low fatigue resistance. Industry has devoted significant investments of time and money to develop new high temperature magnesium alloys. An alternative solution is to design the engine with reduced stress, temperature, and creep requirements that do not exceed the material properties of currently available materials.

As previously discussed, the second potential area for significantly reducing the weight of a portable generator is the alternator. The greatest potential for weight savings is to design the alternator as an integral component of the engine. That is, design the generator as an integrated unit, not the coupling of individual units. Fully integrated systems where the alternator is integral to the engine flywheel are common in the marine industry. However, the electric power generated by the alternator is small compared to the mechanical power generated by the shaft. The mechanical power is typically used to drive a mechanical mechanism such as a propeller and the electrical power is typically used for auxiliary lighting and control equipment. Those alternators are not designed to utilize all of the mechanical power generated by the engine shaft. In generators, where a much higher percentage of the mechanical power is converted to electrical power, there is a larger portion of waste heat that is developed due to the conversion. The waste heat is produced due to the inefficiency of the power conversion devices and must be removed for proper operation of the generator. Further, marine engines with flywheel alternators are typically water-cooled.

In portable electric generators, a fan sufficient for removing large quantities of waste heat produced by power electronics must be incorporated. Finned structures common on existing flywheel/alternators are not able to provide ample cooling to both the engine and the alternator. Most often the fins merely ventilate low power electronics used to create a spark for spark ignition type engines or low power electronics used to run auxiliary systems. Larger power generation creates larger quantities of waste heat that can not be removed by simple paddle style circulators.

SUMMARY OF THE INVENTION

The present invention relates to portable electric power generation equipment where external mechanical power is not required. The internal combustion engine and the flywheel/alternator are designed as an integrated unit and the flywheel/alternator is the only driven mechanism of the engine. Furthermore, circuitry is used so the alternator can function as a motor starter and then switch to an alternator function once the engine starting has been completed. Since the entire winding of the alternator is used during starting, the starting torque capability is much greater than a conventional starter motor. In addition, the starting action can be operated indefinitely without any concern of overheating, as is common with a conventional starter motor. There are also no life limiting or maintenance concerns related to the starter pinion gear getting stuck engaged or disengaged or any wear associated with the mating pinion and ring gears. The overall parts count and therefore the cost of manufacture and the weight of the system are also greatly reduced.

The internal combustion engine in the currently preferred embodiment is of the compression ignition type, although it will be apparent to anyone skilled in the art that the present invention also applies to spark ignition type engines.

Therefore, in light of the benefits of an integrated, lightweight, portable generator, as well as, the aforementioned shortcomings in the prior art, this invention has among other things, the following objectives:

To provide an improved internal combustion engine that is capable of utilizing existing lightweight alloys. Existing light alloy materials often have creep resistance at elevated temperatures that is less than the creep resistance of heavier materials.

To integrate the generator alternator and starting functions into the engine flywheel to eliminate excessive components and reduce weight. The new flywheel alternator/starter provides inertia to reduce speed fluctuations, provides a means of cooling both the electrical and mechanical components, and generates electrical power.

To use the stator windings and rotating magnets and magnetic material of the flywheel to serve as both the alternator power generation function when the engine is operating and the engine starting motor function during the starting of the engine.

To provide an electrical connection arrangement where the starting power source, typically a battery or batteries, supply additional output power for load leveling or to provide a power surge capability much greater than the generator alone.

To provide an improved multi-function engine cowling, that not only provides protection from and to the rotating components, but also serves as a fan shroud, a fan scroll (or volute), a coolant distributor (to cool the engine, alternator, and engine oil), an electronic cold plate (for mounting and cooling ac-to-dc power conversion electronics during power generation, dc-to-ac power conversion electronics during motor starting, voltage regulation electronics, current regulation electronics, and/or control electronics), and a coolant duct.

BRIEF DESCRIPTION OF THE DRAWINGS

Other objects, advantages and novel features of the present invention will become apparent from the following detailed description when considered in conjunction with the accompanying drawings herein.

DETAILED DESCRIPTION OF THE INVENTION

The present invention relates to portable electric power generation equipment. The internal combustion engine and the alternator/starter are designed as an integrated unit and the alternator/starter is the only driven mechanism of the engine and the only electrical start mechanism on the engine. The engine can be equipped with a manual recoil starter attached to the flywheel alternator/starter if desired. The internal combustion engine in the currently preferred embodiment is of the compression ignition type, although it will be apparent to anyone skilled in the art that the present invention also applies to spark ignition type engines. The following terms are defined to assist with the description of the invention as used the context of the present invention.

An internal combustion engine (or engine) is a device that generates mechanical power through the combustion of fuel. Compression-ignition engines and spark-ignition engines are types of engines.

An alternator is a device that converts mechanical power into alternating electrical power through the use of electromagnetic fields. Permanent magnet alternators are a type of alternator wherein the magnetic field is generated by permanent magnets.

An electric-powered engine starter is a device which will use electrical power to crank the engine until it starts. Permanent magnet motors are a type of electric-powered engine starter wherein an alternating electric field generated by the alternating current in the stator causes the permanent magnets attached to the rotor to rotate.

A flywheel is a device that provides inertia to a rotating machine. In the context of this invention, the inertia is provided to reduce speed fluctuations and vibration of the engine.

A flywheel alternator/starter is a component wherein the function of the alternator, the function of electric-powered engine starter and the function of the flywheel are combined in a single component or single subassembly.

An electric generator (or generator) is a generic term for a device that creates electrical power. In the context of the present invention a generator is comprised of an engine and an alternator.

An engine cowling is a generic term given to an engine cover. In the context of the present invention, the engine cowling is comprised of one or more components and provides multiple functions.

Figure 2:
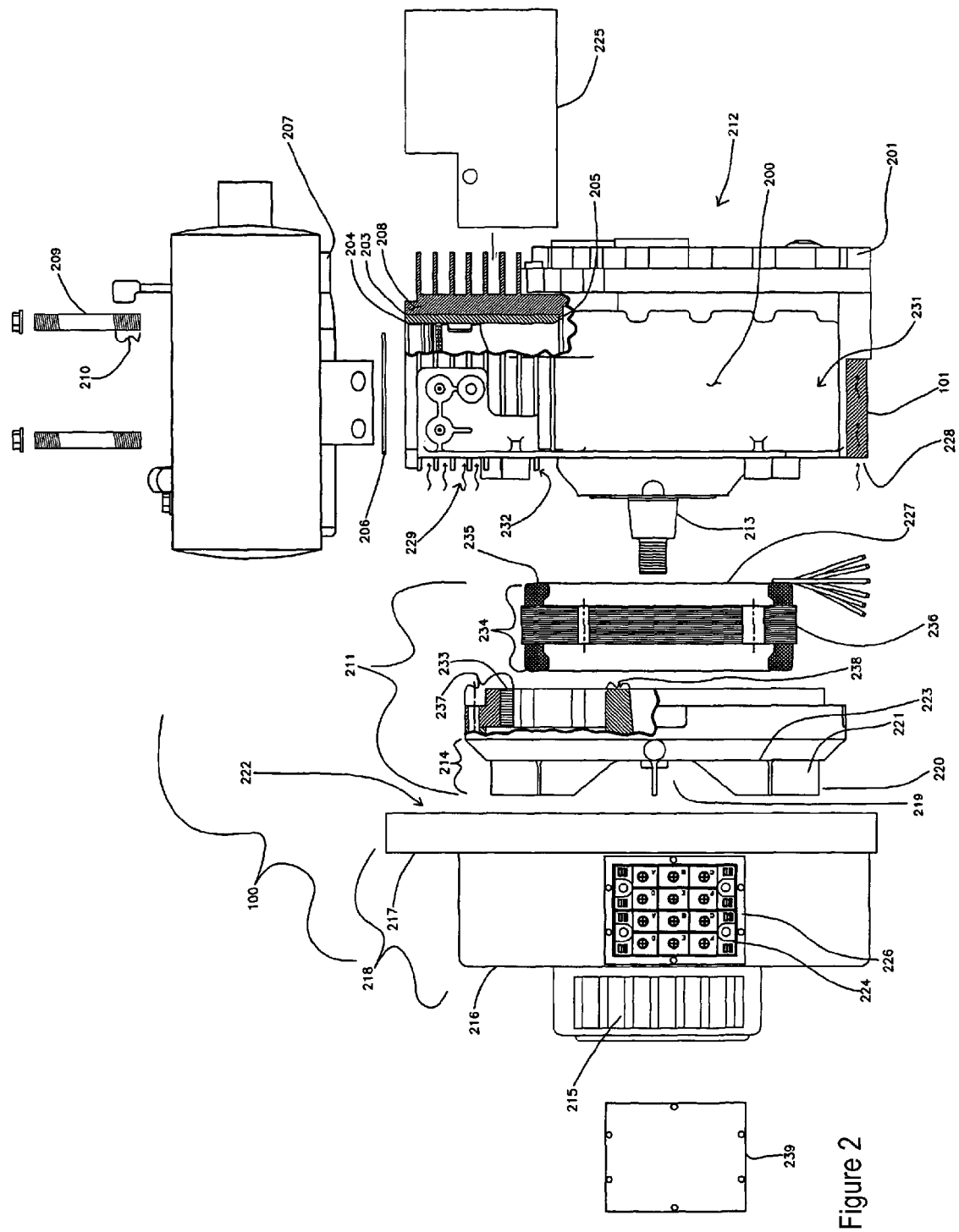
FIG. 2 is a partially exploded side elevational view of the electrical generator of FIG. 1.

Referring to FIG. 2, the engine block 200 and engine block cover 201 are fabricated with a light alloy. For mobile applications where a lightweight generator is desired, the preferable light alloy is magnesium. Magnesium alloys have a density approximately two-thirds that of aluminum alloys and only a slight reduction in room temperature strength. However, the present invention is not limited to magnesium and other alloys such as aluminum are also possible. The light alloy engine block may be cast, machined from wrought metal, forged, or formed using conventional methods.

A portion of the engine block contains one or more cylinder walls 203. A cylinder liner 204, preferably made of a high temperature metal such as cast iron, is either cast in place, press fitted, or shrunk fitted into each cylinder bore. An interference fit is created between the cylinder wall 203 and cylinder liner 204 that must be large enough to maintain an interference fit during high temperature operating conditions. It is common that the cylinder wall 203 will expand at a greater rate than the cylinder liner 204 due to higher coefficient of linear thermal expansion. A shoulder 205 or other retaining means is included at the base of the cylinder wall 203 to prevent downward movement of the cylinder liner 204 in the event of a loss of interference fit.

The cylinder gasket 206 and engine head 207, which are removable during disassembly, restrict upward motion of the cylinder liner 204. Because the cylinder head 207 forms one wall of the combustion chamber, the head must be formed from a high temperature metal or a metal coated with a high temperature material. In the currently preferred embodiment, aluminum is used as the head material. The head is attached to the cylinder housing 208 using threaded fasteners such as head bolts or head studs 209. These fasteners are highly stressed during the compression stroke in compression ignition engines due to the high gas pressure required for self-ignition. The axial stress of the fastener is transmitted to the cylinder housing 208 through the threaded portion of the fastener 210, thus creating high stresses in the cylinder housing 208. When magnesium alloys are used for the engine block 200, elevated temperatures reduce both creep resistance and threaded fastener load retention of the cylinder housing 208. For highly stressed threaded fasteners where pullout due to thread stripping or fastener backout may introduce life and reliability concerns, threaded inserts may be employed. An increase in thread tensile area provided by the insert prevents thread stripping. The high temperature strength of the intermediate threaded insert material prevents fastener backout due to creep.

In the disclosed invention, the integrated generator 100 contains a flywheel alternator/starter 211 that performs multiple functions. Specifically, the flywheel alternator provides inertia for the engine 212, electrical power generation, engine starting and a speed and voltage regulating device for the electrical power generator. For air cooled or combined air and liquid cooled configurations, the flywheel alternator/starter 211 also provides forced air cooling for the internal-combustion engine 212, alternator/starter 234, and electronics. The air cooled electronics are typically mounted to a cold plate or heat sink and housed in an electronics box 226. The electronics box may be mounted on the engine cowling or another location on the generator, such as an instrument panel.

Cyclical combustion of reciprocating-type internal combustion engines creates torque pulsations that would result in crankshaft 213 speed fluctuations if the crankshaft 213 were not restrained. The rotor of the flywheel alternator/starter provides an inertial means of reducing the speed fluctuations and engine vibration. Constant speed is also beneficial to permanent magnet alternators to regulate voltage, current, and frequency.

Flywheel size is a function of the required mass-moment of inertia. Torque variation in the crankshaft, generated by the cyclical combustion process, is calculated throughout one complete cycle. The mean torque value for the complete cycle is used to calculate instantaneous kinetic energy and energy variation throughout the cycle. Net kinetic energy, energy variation difference, and allowable speed range (or coefficient of speed fluctuation, defined as the allowable speed range divided by the mean speed) are then used to determine the required mass-moment of inertia. The smaller the allowable speed range (or the smaller the coefficient of speed fluctuation) the larger the required mass-moment of inertia or vise versa. By way of example, a net kinetic energy of 163.78 J (120.80 ft-lbf), an energy variation difference of 239.53 J (176.67 ft-lbf), an allowable speed range of plus or minus 360 rpm, and a nominal rotational speed of 3600 rpm (a coefficient of speed fluctuation of 0.2) results in a required mass-moment of inertia of 0.00843 kg-m$^2$ (0.200 ibm-ft$^2$). This coefficient of speed fluctuation is typical for machines where large speed variation is acceptable. In the currently preferred embodiment, the mass-moment of inertia is larger due to alternator/starter requirements and therefore the speed fluctuations are smaller. A mass-moment of inertia of 0.0169 kg-m$^2$ (0.401 ibm-ft$^2$) results in an allowable speed range of plus or minus 120 rpm (a coefficient of speed fluctuation of 0.067). This coefficient of speed fluctuation is typical in cases where moderate speed variation is acceptable. The present invention is not limited to this speed variation or mass-moment of inertia as other values are acceptable. No additional inertia mechanism beyond the rotor of the flywheel alternator/starter is required for the generator 100.

Figure 3:
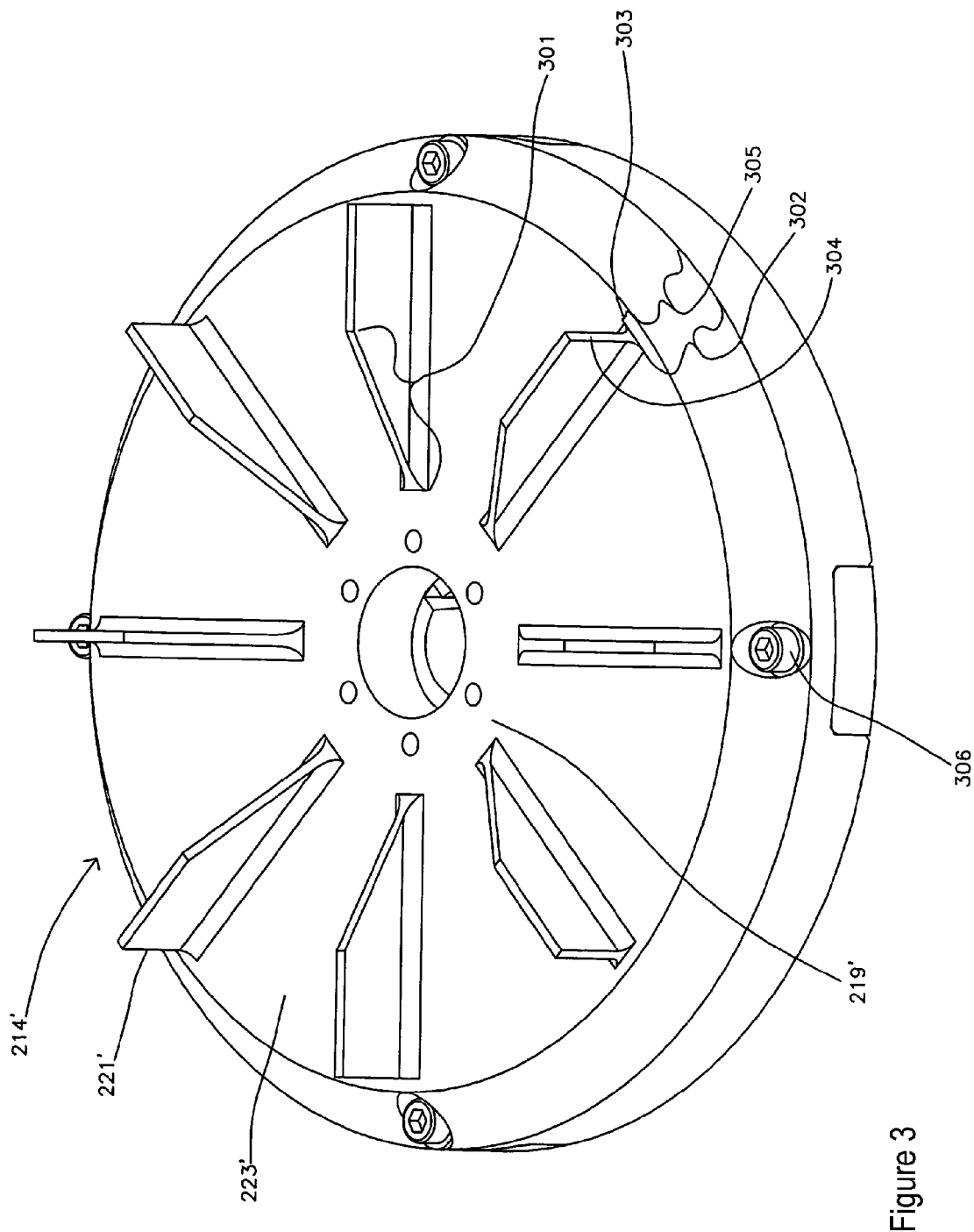
FIG. 3 is a back perspective view of the flywheel alternator/starter with an integral centrifugal-type cooling fan.
Figure 4:
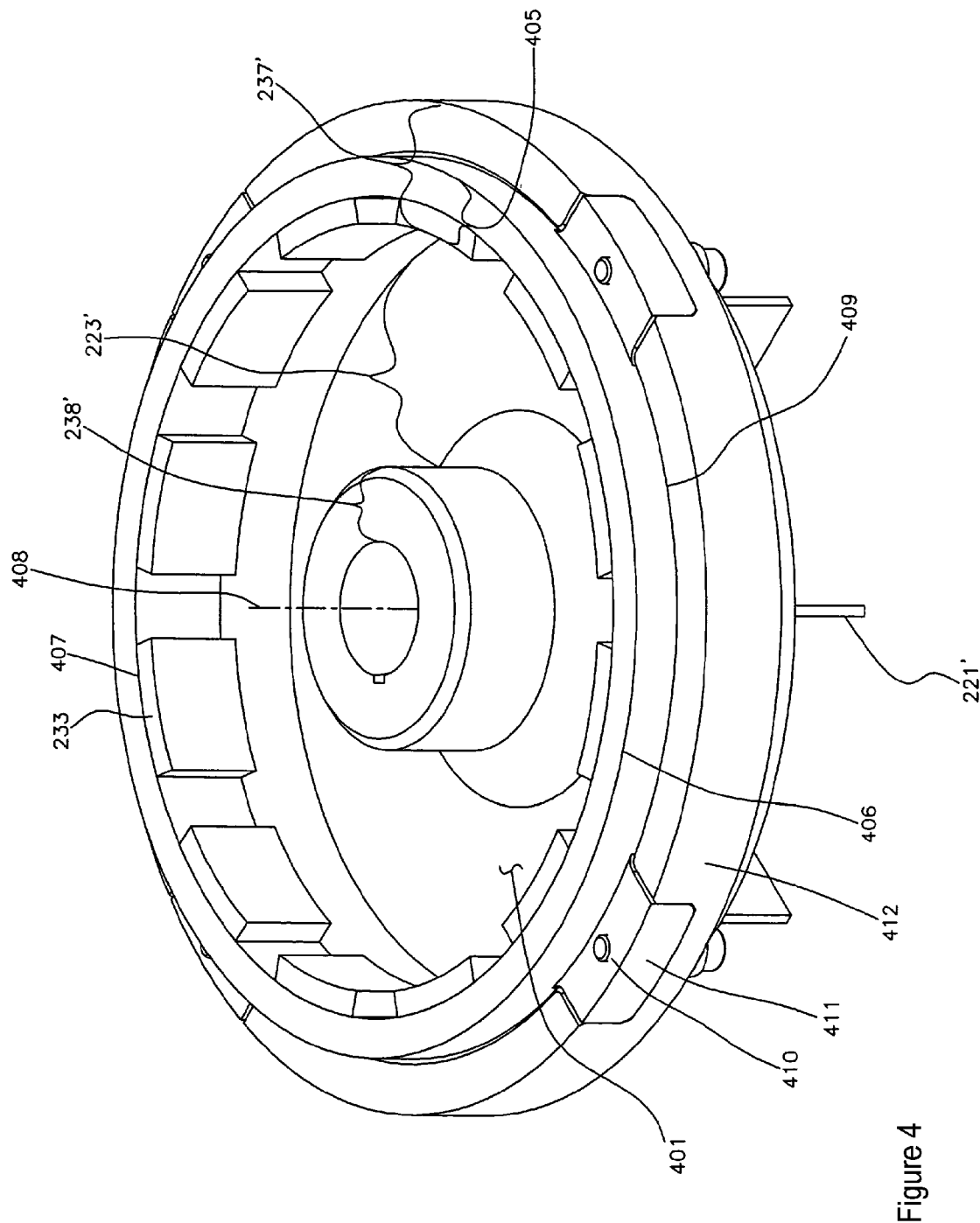
FIG. 4 is a front perspective view of the flywheel alternator/starter with an integral centrifugal-type cooling fan as shown in FIG. 3.
Figure 7:
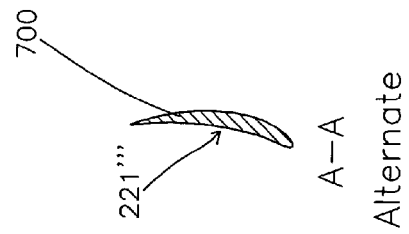
FIG. 7 is a cross-sectional view of an airfoil blade for axial-type fans.
Figure 6:
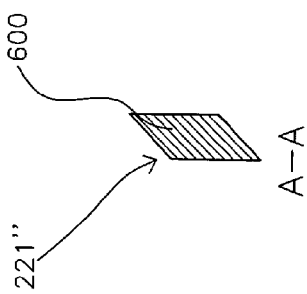
FIG. 6 is a cross-sectional view of a constant angle blade for axial-type fans.
Figure 5:
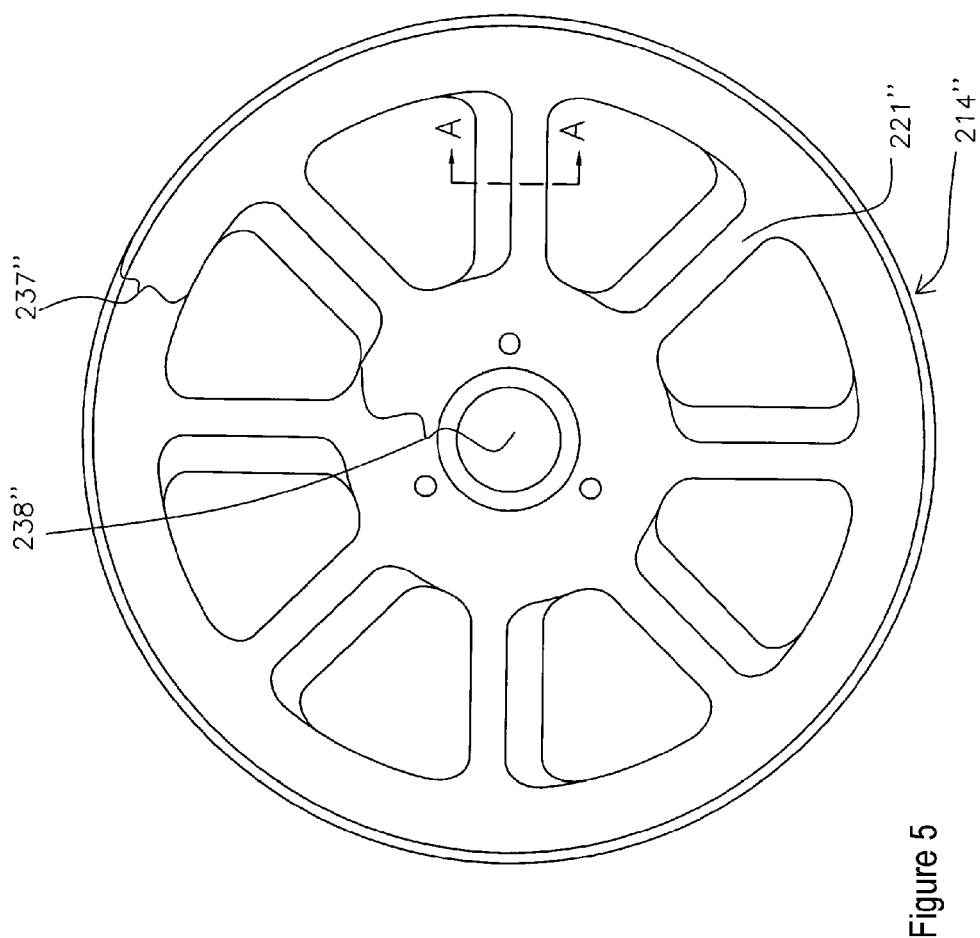
FIG. 5 is a front perspective view of the flywheel alternator/starter with an integral axial-type cooling fan.
Figure 8:
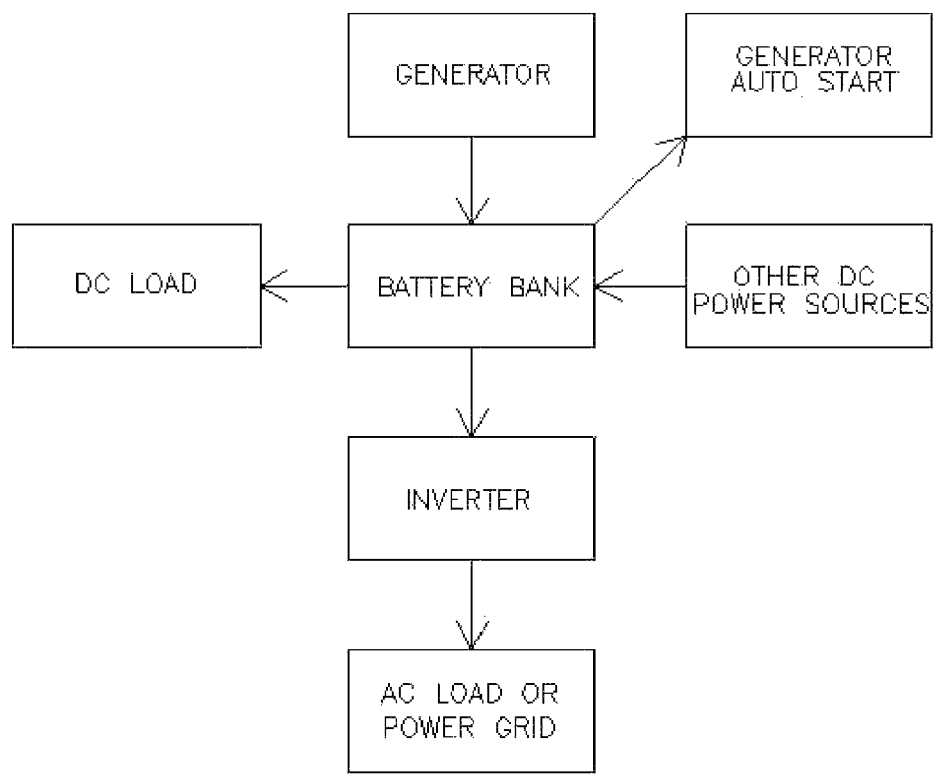
FIG. 8 is the energy flow diagram for the generator. This configuration allows an energy surge capability to be supplied by obtaining additional transient power from the same battery, batteries or any other DC power source used for starting the generator. Multiple DC power sources, including batteries and other alternative power sources including wind or solar power, are wired in parallel with the output of the alternator (after the DC conversion). The normal energy flow is from the alternator into the batteries but during starting the energy flow is from the batteries into the alternator.

For air cooled and combined air and liquid cooled applications, the flywheel alternator/starter also contains a fan 214 for cooling the generator. The fan can be of the centrifugal-, axial-, of mixed flow-type. Referring to FIGS. 3 and 4, in the centrifugal-type fan 214', the fan blades 221' provide the singular function of providing forced air cooling for the generator. The fan hub 223' provides the mechanical connection of the inertia portion 237' of the flywheel to the mounting portion 238' of the flywheel and acts as a single solid spoke. If the fan blade/fan hub assembly or impeller is shrouded, the impeller shroud may also act as a way of attaching the inertia portion of the flywheel to the mounting portion of the flywheel. The impeller shroud can be used to either decrease the stress in the spoked hub or decrease the cross-sectional area of the spoked hub 223'. Openings (not shown) may be formed into the fan hub 223' to increase airflow to the backside of the hub 401 for cooling generator components. The additional openings increase the number of spokes on the fan hub 223'. In the axial-type fan 214" shown in FIGS. 5-7, the fan blades 221" perform two functions. The first function is to impart momentum to the flow, thereby forcing air through the engine cowling to cool the generator. The cross-sectional area 600 of the fan blades 221" can be of the simple constant angle type (FIG. 6) for ease of manufacturing or for the fan blades 221''' of the airfoil type 700 (FIG. 7) for optimum efficiency. The second function is to provide a mechanical linking of the inertia portion of the flywheel 237" to the mounting portion of the flywheel 238". In this sense the fan blades 221" also act as flywheel spokes. Mixed flow-type fans can also be employed. Again, the fan not only generates the flow necessary for cooling the generator/starter, but also mechanically fastens the inertia portion of the flywheel to the mounting portion of the flywheel. It should be clear to anyone skilled in the art that the entire fan acts to provide inertia. Reference is made to the inertia portion 237 of the fan only to indicate that due to the relatively large amount of mass at the largest diameter that this section of the flywheel typically provides more inertia than the fan blades 221, fan hub 223, fan shroud (if employed), and mounting portion 238 of the flywheel.

Both the internal combustion engine 212 and electric power generation components are cooled. They can be air cooled or liquid cooled using an antifreeze solution or another heat transfer fluid in combination with a pump and radiator as is well known in the art. The unit can also utilize a combination of air and liquid cooling. When air cooling is utilized, either in whole or part, the fan 214 draws air through inlet opening 215 of the fan shroud 216. The fan shroud 216 and the shroud mounting portion 217 are integral to the engine cowling 218. The fan 214 moves the air from the low-pressure side 219 of the flywheel alternator/starter to the exit of the flywheel alternator/starter 220, increasing the air pressure in the process. In the currently preferred embodiment, a centrifugal fan 214' is used. Air enters the fan inlet 219' primarily in an axial direction. The fan impeller blades 221' impart momentum to the air, moving the air centrifugally outward and increasing the stagnation pressure of the air. The fan impeller blades 221' may be curved for optimum efficiency or ease of manufacturing. In the currently preferred embodiment, eight fan blades 221', each with a total blade length equal to 2.525 inches and a blade thickness equal to 0.100 inches are employed. The blade inlet 301 begins at a radial distance 1.350 inches from the fan axis and tapers to a height of 0.830 inches at a radial distance 2.750 inches from the fan axis. A diffuser 302 either of the vaned or vaneless type is located concentrically with respect to the fan impeller. The diffuser 302 converts some of the air stagnation pressure to static pressure prior to entering the fan scroll 222 or volute. As the air is collected in the scroll 222, more of the stagnation pressure is converted to static pressure. The scroll 222 is also integral to the engine cowling 218. In the currently preferred embodiment, a straight vaneless diffuser region 303 extends 0.438 inches radially from the end of the blades 304. A tapered vaneless diffuser region 305 extends another 0.250 inches radially beyond the end of the straight vaneless section and 0.250 inches axially from the fan hub surface 223'. The scroll 222 spirals outward, beginning at 0.250 inches radially from the diffuser 302 and ending at 1.500 inches radially from the same diffuser 305.

The engine cowling 218 performs several functions. An integral fan shroud 216 is provided that protects the rotating fan 214 from foreign objects and also protects users from the rotating fan 214. The engine cowling 218 also protects the flywheel alternator/starter 211. In the case of a centrifugal-type fan, the fan shroud 216 completes the high velocity fan passages formed by the fan blades 221 and fan hub 223. It should be noted that the fan shroud 216 is not required to be integral to the engine cowling 218. The fan shroud 216 can also be integral to the fan impeller as described previously. The engine cowling 218 also contains the scroll 222 for centrifugal-type fans. A portion of the scroll 222 or engine cowling 218 may be used to cool high power devices mounted to a coldplate that is an integral part of the engine cowling. The engine cowling 218 also directs the flow of air to the engine 212. The removable ductwork 225 provides an air cooling passage that controls the flow of air to critical engine locations, including the cylinder wall, the engine head, the engine block, and the oil sump.

Figure 1:
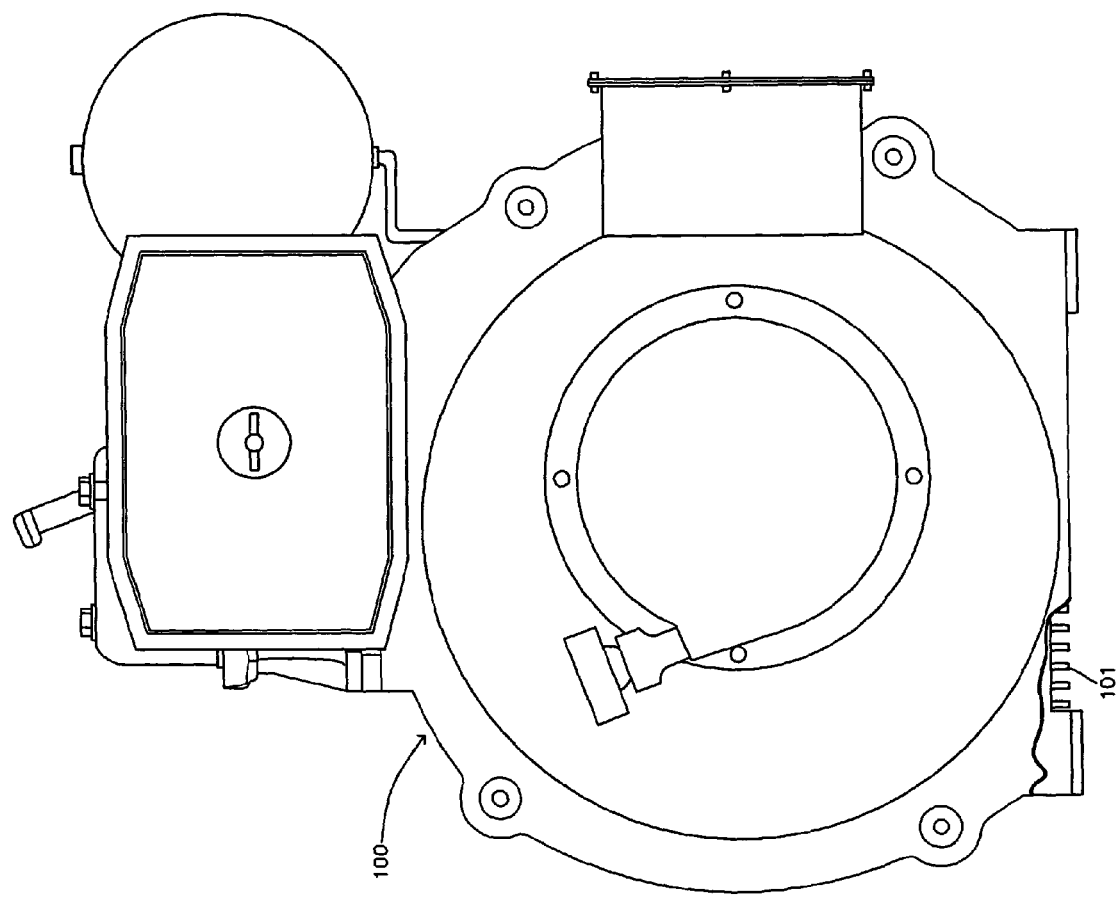
FIG. 1 is an end elevational view of the currently preferred embodiment of the electrical generator in accordance with the present invention.

For air cooled applications, cooling air is first directed to the generator electrical components, which are typically required to be maintained at a lower temperature than the engine 212. The air cools the electronics coldplate 226 and then the alternator stator 227. Electronic devices, such as active power converters 224, passive diode rectifiers, or other power and control electronics can be mounted to the coldplate. After cooling the critical electrical components, the air splits into multiple flow paths. One flow is at the base of the engine 228 and the other flow 229 is around the cylinder housing 208 and the engine head 207. The flow passage at the base of the engine 228 contains fins 101 (FIG. 1). As these fins 101 are integral to the engine block 200, their geometric dimensions are optimized based on the material selected for the engine block material. The purpose of cooling the engine block 200 at this location is to remove heat from the oil. The oil sump or oil reservoir 231 for the engine block 200 is located at the side of the engine block opposed to cooling fins 101 at the base. The oil temperature must be maintained at a level, typically less than 240° F., the temperature at which most additives in the lubrication oil break down. The passage 229 at the cylinder housing 208 and head 207 of the engine 212 also contains cooling fins 232. These fins 232 are also integral to the engine block 200 and geometrically dimensioned so as to optimize the removal of heat from the cylinder housing 208 and head 207. The optimization is a function of the engine block material.

In the currently preferred air cooled embodiment, cooling fins 232 are fabricated integral to the engine block 200 and cast with a magnesium alloy. Eight fins 232 spaced 0.315 inches apart with a fin thickness of 0.080 inches, heights of 0.280 inches and lengths ranging from 3.25 to 4.86 inches were determined to provide the optimal heat removal from the cylinder housing 208 and head 207. This configuration provides approximately 1400 Watts (4780 Btu/hr) of cooling when the temperature difference between the average fin temperature and the ambient temperature is 170° F. Fifteen fins 101 spaced 0.300 inches apart with a fin thickness of 0.100 inches and a fin height of 0.275 inches remove additional heat from the oil sump 231. Approximately 150 Watts (512 Btu/hr) of heat is removed when the temperature difference between the average fin temperature and the ambient temperature is 170° F.

The flywheel alternator/starter 211 also produces the electrical power for the generator 100. The preferred alternator type is a permanent magnet alternator. Permanent magnet alternators are the simplest, most efficient, and most reliable type of alternator. There are no brushes, slip rings, or rotating fields, thereby eliminating wear components and reducing electro-magnetic interference emission. Permanent magnet alternators are typically classified as either axial gap or radial gap, referring the orientation of the airgap between the rotor and stator relative to the axis of rotation. Axial gap (also known as pancake or disc-type) alternators have the advantage of low cost and ease of manufacture. However, they are not generally considered for high power applications due to large eddy current losses and excessive heating at speeds above 1000 rpm. Axial gap alternators can be made with a relatively small radial dimension. For flywheel alternator applications, where the inertia of the flywheel is critical for engine operation, radial constraints are often secondary. Radial gap permanent magnet alternators can have either an interior or exterior rotor. Again, for applications where the inertia of the flywheel is necessary for engine operation, the exterior rotor is often preferred. This configuration places the largest amount of mass at the greatest radial distance from the crankshaft axis. The engine inertia can be increased (speed fluctuations reduced) for the same rotor mass. This configuration is preferred for mobile applications where weight is the primary design constraint.

Electrical power is generated by the motion of the permanent magnets (magnetic field) 233 relative to the stator (stationary armature) 234. As the alternately oriented north and south magnetic pole pieces pass the stator coils 235, they induce a voltage in the coils 235, first in one direction and then in the opposite direction in accordance with the type of pole. The frequency and magnitude of the alternator output voltage is directly related to the speed of the alternator rotor 405. For flywheel alternators 211, where the alternator rotor 405 is mounted on the engine crankshaft 213, the output voltage is also directly related to the rotational speed of the crankshaft 213. Therefore, speed fluctuations minimized by the flywheel inertia also effect alternator performance. If the permanent magnets 233 pass the stator faster, the voltage will alternate directions more quickly, leading to a higher frequency. The magnitude of the voltage induced in the stator coils 235 is dictated by Faraday's Law, which states that the induced voltage is directly proportional to the rate of change of magnetic flux. This rate of change is again dictated by the speed with which the magnetic poles pass the coils 235. As this speed increases, so does the induced voltage.

The applied load dictates the current. However, the magnetic field from the load current creates a counter-torque to the mechanical torque applied to the shaft. Therefore, as the load current increases, the rotational speed of the shaft is slightly reduced, and this in turn decreases the frequency and level of the output voltage.

The output power from the alternator/starter is alternating current, typically multi-phase, and commonly at a frequency that is not acceptable to the end-user. Therefore, power conditioning is required. The simplest form of power conversion for a 28-VDC output from a Permanent Magnet (PM) alternator is passive diode rectification through three-phase full-bridge rectifiers. This technique is best suited for constant load, constant engine speed operation, without voltage regulation and adjustment. However, many applications typically have a highly variable load, and some requirements such as military operations, require voltage regulation and adjustment. This can be accomplished through active rectification, and the methods are well known in the art.

The concept of using the alternator as the engine starter is not new, this approach being originally pioneered for the automotive industry to reduce costs by reducing the components (http://www.irf.com/product-info/auto/isaapp.html, http://www.sae.org/automag/electronics/11-2001/). The necessary circuitry that provides switching to allow the alternator/starter to be powered as a starter motor until engine starting has been detected, then switch to an alternator is known by those skilled in the art. However the approach being used here has extended this capability so that in addition to the combination of starting and power generation, the starting power source, typically one or more batteries, also provide output power, thereby allowing increased power surge capability, short-term power for low loads where the generator engine need not be started, or start-stop engine cycling reduction. This approach is different in that 1) all DC power producing and DC power consuming components (which must be designed for the same operating voltage) are all located in parallel circuits sharing common terminals with the batteries (FIG. 9), 2) a current sensor between the alternator/starter and the battery or other energy storage device is used to determine when to stop the generator and 3) a voltage measurement across the battery terminals, or other energy storage device, is used to determine when to start the generator.

For AC power surge capability, the inverter is sized for the generator output plus the additional surge capacity that is desired, and the battery or batteries are sized to provide the additional energy required for the desired energy surge period.

For additional AC power surge capability, the inverter, can be designed to provide a variable frequency AC output, thereby providing a soft start capability for highly inductive loads.

Figure 9:
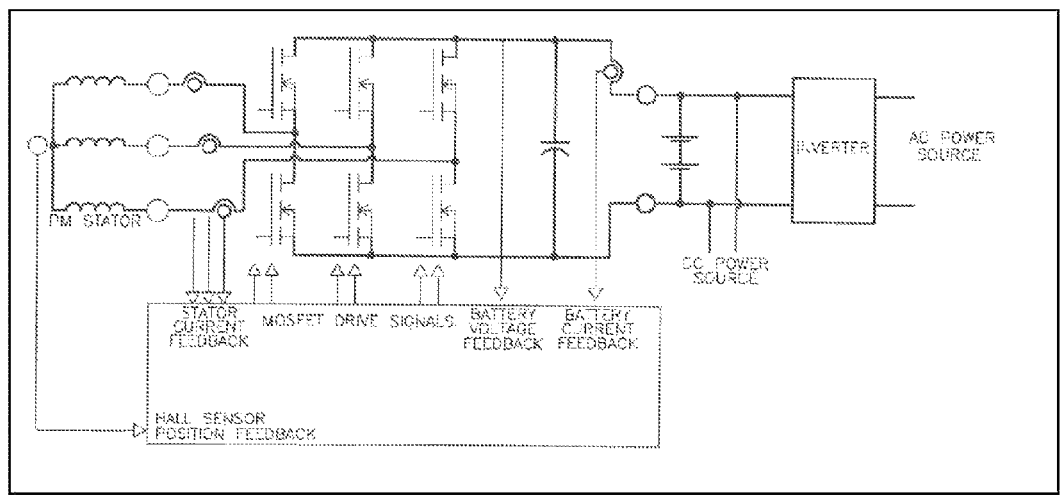
FIG. 9 is a typical wiring diagram for the integrated starter/alternator electronics. In addition to the dual use of the alternator as both a starter and an alternator, this circuit allows for automatic starting and stopping of the generator if desired.

As shown in FIG. 9, the current sensor is located in the generator output circuit wiring between the alternator output and the battery or batteries. The loads are all wired in parallel to the battery terminals. In this configuration current flow to recharge the battery (or batteries) as well as any power flowing to the loads will be detected by the current sensor. When the current flow diminishes to a negligible value, then the load is essentially zero and the battery or batteries are fully recharged.

In this configuration when the generator is operating, either a power demand or a low battery condition will result in a current flow from the alternator to the battery terminals. If there is no external load, the unit does not immediately stop, rather the generator output is used to automatically recharge the batteries as needed. As the battery or batteries charge, the current demand will decrease because the cell voltage increases as the batteries charge. This current flow will be indicated by the current sensor. When this current diminishes to a negligible value, this indicates that there is no appreciable power demand, caused by either a load or a low battery, and therefore the generator can be shut-off. The determination of what constitutes a neglible value is easily determined by one skilled in the art and in part depends on the total energy storage capacity, the type of energy storage device, and the no-load current draw of the inverter and other downstream electrical devices. Alternatively, an voltage-monitoring circuit can be used to shut-off the generator. When the voltage reaches a predetermined value, indicating a full-battery charge, the circuit shuts off the generator.

The use of a voltage monitoring circuit, across the poles of the battery or batteries can be used to determine when to start the generator rather than simply auto starting the generator whenever a closed circuit is present, that is, a load detected on the generator output circuit. The advantage to starting when the battery terminal voltage drops below a preset value is that the system will not need to start the generator for every small load. The actual load that will require engine starting depends the capacity of the battery or batteries used for energy storage, the type of battery to be recharged, and the recommended minimum voltage for a particular battery type. This minimum voltage can be easily configured for each particular application. Thus, "small loads" is a relative term that depends on the capacity and type of batteries or energy storage device being used. The advantage of this approach is avoiding engine starting for very small loads, because instead of starting the generator, the necessary power is supplied by the batteries until the cell voltage drops to a predetermined minimum level and then the generator is automatically started. This reduces start-stop cycles, allows the generator to operate at full capacity when it is operating, and allows the generator to run for longer continuous periods after it is started. This approach will also eliminate deep cycling of the batteries, significantly improving their life, since the generator will automatically start to charge the batteries as needed.

Since the required engine starting torque is much smaller than the capacity of the alternator, the integrated approach means the starter's torque is well in excess of the cranking requirements, meaning this starter can be operated continuously without overheating or otherwise degrading the life of the starter/alternator. This is a desirable feature, since in a typical lightweight generator configuration, to reduce weight the starter motor is under-designed and can only be cranked for short periods of time. (See Yanmar Air-Cooled Diesel Engine Operation Manual L-A Series for an example). Use of a heavy-duty starter motor would alleviate this problem with penalties of weight and cost. In the Integrated Starter Motor configuration, the starter motor adds no additional weight, since it is also the alternator, and the control circuitry weighs no more than the components needed for passive rectification. Therefore, the integrated starter/alternator has the additional benefit of reducing weight while also lowering the parts in a generator system and increasing reliability.

An integrated starter-alternator (ISA) allows the PM alternator to be operated in reverse as a PM motor for starting the generator from the system battery. The ac-to-dc power conversion electronics are typically comprised of active rectifications circuits that are capable of regulating and adjusting the output voltage of the generator and the dc-to-ac power conversion electronics are also comprised of active power inversion circuits. It is apparent to those skilled in the art that the active power converters can be IGBTs, MOSFETS, or other active solid-state devices. However, if voltage regulation and adjustment is not required it is possible to use passive diode type rectifiers for the ac-to-dc power conversion with active power devices for the dc-to-ac power conversion for motor starting.

This generator can produce regulated Direct Current (DC) electric power from the voltage regulation circuit and this power can be used in many DC devices. When Alternating Power (AC) is desired the DC power must be converted to AC power via an inverter. Rather than utilize a separate inverter, to reduce weigh and provide other benefits the inverter is integrated into the generator system.

The electric starting requires a power source, such as a DC battery to provide electrical power to the alternator/starter during engine starting. In a typical configuration this input power source is momentarily connected to the starter motor with a starter solenoid as previously discussed in the Description of Related Art section. Alternatively, for this invention, the battery in the system does more that simply start the generator when needed. The battery or bank of batteries, depending on the application, also provides the secondary advantage of providing a short-term supply of additional DC power to the inverter, thereby allowing the inverter to supply a short-term increase in the power capacity of the system, which is useful for starting inductive loads such as motors, compressors and the like. These devices have a transient surge capacity, which normally require the generator to be over-sized simply to accommodate this starting surge demand for energy. By utilizing the energy stored in the battery to accommodate this short-term transient, this enables a smaller generator to power the inductive loads. For instance, an electric motor that requires 1.2 kWe at full load may require a transient surge of energy that is approximately seven-times the steady-state power consumption or 8.4 kWe for a very short time. Even though this surge of power might last less than 10 seconds, it would overload and stop a normal generator. The typical solution to this problem is to oversize the generator and the result of such a decision is a generator that is approximately 4 to 5-times larger than needed to maintain steady-state operation, resulting in poor fuel economy and wet stacking problems with the diesel engine due to the light load.

The aforementioned integrated inverter-battery approach provides a much better way of accommodating the transient starting problem without over-sizing the generator. This results in considerable fuel savings. The battery or battery bank, accommodates the surge demand because the charge stored in the battery will seamlessly supplement the generator output power whenever inverter demand exceeds generator capacity. One skilled in the art will also recognize that the power source is not limited to batteries, that a DC bus can be used which utilizes power from one or more DC power sources including batteries, solar power, wind power, and the like. One skilled in the art will also recognize that this concept can be extended to load-leveling applications, where the generator supplies the average power demand, and the battery bank is used to average out the energy demands thereby lowering the overall size of the generator and allowing the generator to operate at full power (when operating), thereby reducing wet stacking problems and improving fuel economy. In such a configuration, the generator is either operating at full power or shut off. One skilled in the art will understand that using the disclosed configuration for either power surge capability or load leveling capability will reduce the size of the generator needed.

The basic concept is that the regulated DC output of the generator and the battery (used for motor starting) are always connected in parallel at the alternator output (after active or passive power rectification to DC), which is also the input to the inverter (FIG. 9). This battery is also used for starting the engine, when the integrated starter/alternator is used to start the engine. That is, the energy flows from the starter/alternator to the battery when the engine is running and the alternator is producing power. The energy flows in the opposite direction through the same wiring, from the battery to the alternator/starter during engine starting, when the alternator/starter is consuming power to crank the engine. With this configuration, when the DC electrical demand exceeds the generator output capacity, instead of stalling the generator, as the voltage across the common DC terminals dips, the battery or batteries automatically supply the additional power necessary to maintain the common terminal voltage. Likewise, when the AC electrical demand exceeds the generator output capacity, as the input voltage to the inverter dips, the battery automatically supplies additional power to maintain the common terminal voltage to the inverter, preventing generator stalling. Of course, the battery capacity and inverter must be sized to be sufficient to accommodate the transient demand for energy.

This is a departure from the typical electric starting generator where the battery is used to start the engine, via a relay or starter solenoid which temporarily connects the battery to the motor starter during starting, then disconnects the circuit after the motor starts. In the typical configuration, the battery used by the starter is not connected directly to the output of the generator and this starting battery is recharged via a separate DC alternator and voltage regulation/charging circuit or a charging circuit in the inverter is used to recharge the starting battery, With this configuration of the battery connected to the DC output of the generator, the battery is recharged by the system automatically after the starting surge is over. If all loads turn off or turn down significantly, the generator will continue to operate, re-charging the batteries as necessary. When the current output from the generator drops below a certain threshold (meaning the battery is almost fully charged), and the other loads are small, the generator will shut itself off, ensuring the generator is only operating when there is efficient use of its output power. After the generator shuts down, the system monitors the battery charge to determine when to restart; that is, the generator does not restart every time a load is applied to the system. Power is supplied solely by the battery first, if possible. This avoids the problem of a generator running when there is only a very small load being powered. In such a case, with this system, the necessary AC or DC power will be supplied from the battery and inverter or battery, respectively, with the generator only restarting as needed to recharge the battery or supply the short fall in energy, when the battery terminal voltage drops below a preset value. In the currently preferred embodiment, where the DC power is connected to 24 VDC batteries, the engine is started when the battery terminal voltage drops below 21-22 volts.

This is only one possible control configuration for allowing transient surge capability, minimizing light load engine operation, and minimizing energy waste by starting and stopping the generator as load and energy storage dictates. More traditional means to determine when starting of the generator is required can also be utilized. Manual electric start and stop can of course also be used.

The permanent magnets 233 are preferably made from high power density materials such a samarium cobalt (SmCo) or neodymium-iron-boron (NdFeB), although any permanent magnet material can be used. The magnets 233 must be maintained at a temperature low enough to prevent demagnetization of the magnets. $Sm_2Co_{17}$ is used in the currently preferred embodiment due to relatively high maximum working temperature and superior corrosion resistance properties when compared to other high power density permanent magnets. The reversible temperature coefficient of magnetization of $Sm_2Co_{17}$ in the currently preferred embodiment does not exceed –0.035% per °C. over a range from 25° C. to 250° C.

For high power and high efficiency operation of the alternator, the permanent magnets must be mounted in a magnetic material, such as AISI 1215 or AISI 1018 steel. The magnetic ring or alternator hub 406 must have a cross sectional area large enough to carry the magnetic flux of the alternator. That is, the magnetic flux density in the alternator hub 406 must not exceed the saturation flux density of the material at maximum operating conditions. The cross sectional area of the alternator hub 406 must also be great enough to handle the stress (hoop stress) created by rotation and must be large enough so that when combined with the other rotating component of the flywheel alternator 211 creates sufficient inertia so as to minimize speed fluctuations. In order to maximize power output, the permanent magnets 233 should be mounted to the alternator hub 406 with alternating pole directions and mounted in an alternator hub 406 manufactured from magnetic material. Other configurations with permanent magnets mounted in uniform pole directions and/or mounted in a rotor fabricated from a non-magnetic material are possible. These configurations are typically used to create a low voltage and/or low current signal typically used to create a spark for spark ignition type internal combustion engines or to power auxiliary equipment. These types of magnetos should not be confused with the disclosed invention wherein large quantities of power must be generated. The efficiency of the currently preferred embodiment is required so that excessive waste heat is not generated. If excessive amounts of waste heat are generated in power generation equipment, then the size and weight of the cooling system becomes large and lightweight portable units are not feasible. The permanent magnets 233 can be mounted to the alternator hub 406 through bonding, clipping, or any conventional method. In the currently preferred embodiment, electrically resistant epoxy 407 is used to adhere the permanent magnets to the magnetic ring. In order to minimize the rotor mass while maximizing the rotor inertia, the components with the densest material are placed at the greatest radial distance from the crankshaft axis of rotation 408. Components that are not at relatively large radial distances contribute very little to the flywheel inertia. Therefore, these components should be made as light as possible. Therefore, the flywheel spokes, fan hub 223', and fan blades 221' are fabricated from a different material than the alternator hub 406. In the currently preferred embodiment, these components are fabricated from a lightweight alloy such as aluminum. The cross-sectional area of the spokes must be sufficient to handle stresses created by the rotation of alternator, magnetic forces imposed by the alternator/starter, and torque transmitted from the mounting portion of the flywheel to the inertia portion of the flywheel. In the currently preferred embodiment the flywheel contains a counterbore 409 to concentrically locate the alternator hub 406 with respect to the flywheel and to maintain a uniform radial airgap circumferentially about the alternator stator 234. Fasteners 306 or clips are used to retain the alternator hub 406 within the flywheel counterbore 409. Alternator hub drive members 411 and flywheel drive members 412 are formed to transmit torque without relying on the fasteners 306. The fasteners 306 merely act to prevent axial movement.

In the currently preferred embodiment, the alternator hub 406 has an inside diameter of 7.300 inches and outside diameter of 8.000 inches. The axial length of the alternator hub 406 is 0.910 inches and corresponds to the axial length of the permanent magnets. The remainder of the flywheel is fabricated from 6061-T651 aluminum alloy. A counter bore 409 is cut on the backside of the alternator flywheel to provide a 0.740 inch clearance between the permanent magnets 233 and the 0.150 inch thick fan hub (solid spoke) 223'. The mounting hub 223' has an outside diameter of 2.420 inches with a 11.42-degree tapered through hole for mounting to the crankshaft 213. The overall dimensions of the alternator flywheel, including the cooling fan, are 9.000 inches in diameter and 2.530 inches in length. The final mass of the flywheel alternator is 6.8 lbs. The steel alternator hub 406 portion provides 36.4 percent of the total inertia. The twelve permanent magnets 233 provide 20.3 percent of the total inertia. The aluminum fan 214 portion provides the remaining 43.3 percent of the total inertia.

The stator 234 is comprised of laminated steel 236 bonded together to form pole pieces. Copper coils 235, through which electric current is induced, are wound around each pole piece. The entire stator subassembly 234 is vacuum pressure impregnated to minimize the potential for electrical shorts and improve corrosion resistance.

A schematic wiring diagram of the currently preferred embodiment of the integrated alternator/starter and voltage regulation electronics is shown in FIG. 9. In the currently preferred embodiment of the flywheel alternator/starter, twelve alternating polarity $Sm_2Co$ magnets generate the magnetic field. A single circuit 801 comprising a three-phase wye connected winding coil 802 is installed in seventy-two slots 803. The circuit is comprised of seventy-two coils, twenty-four coils per phase, three turns per coil, six parallel circuits per phase, and four coils per circuit. The coil span is 1-5. Alternating current and voltage are produced with an amplitude and frequency proportional to the speed of the alternator. In the previously described configuration, with a rotational speed of 3600 rpm, the twelve-pole alternator produces a frequency of 360 Hz. This configuration was selected to improve ripple and output harmonics for rectified dc power generation. If it is desirable to use alternating current directly generated by the machine, then various combinations of speed and number of poles can be combined to produce 50 Hz, 60 Hz, 400 Hz or any frequency required by end-users.

In the currently preferred embodiment, active rectification is used to convert alternating current into direct current. MOSFETS 804 in the circuit produce waste heat that must be removed to maintain junction temperature below a prescribed temperature, typically 150° C. If heat is not removed, the device life will be reduced significantly, ultimately ending in device failure. Prepackaged MOSFETS 224 can be employed to reduce assembly cost. The waste heat generated in a package MOSFET 224 is typically removed from the base. For low power applications, the base can be mounted to any heat sink, such as the generator frame, instrumentation panel, etc. Heat is removed by natural convection. For high power applications, the heat produced by the power converters is too large to be removed via natural convection, i.e. the junction temperature would exceed the prescribed temperature and the MOSFET would eventually fail. Forced air convection or liquid cooling can remove larger quantities of heat required for high power applications.

In order to eliminate the size and weight of an external-cooling fan or assembly, the power converters can be mounted on the engine cowling. The engine fan circulates cool air across the base of the power converter or a plate attached to the base prior to circulating the air to the engine. This configuration is desired because the power converter must be maintained at a temperature less than the engine temperature (i.e., cylinder wall temperature). A single fan (integral to the flywheel as previously discussed) is used to cool the engine, the engine lubricating oil, the alternator, and the power converters and/or other electronics by direct force air cooling. Alternatively, the single fan (integral to the flywheel as previously discussed) can be used to force air across and cool a liquid heat exchanger (radiator) and the secondary coolant in the heat exchanger is then pumped to the engine, the engine lubricating oil, the alternator, and the power converters or other electronics to provide liquid cooling. Of course, it is well known to one skilled in the art to also use a combination of the disclosed air and liquid cooling methods.

The electronics box 226 is removable and replaceable, which is advantageous for field servicing. The box 226 is attached to the engine cowling or liquid heat exchanger via a simple clamp connection such as a flange. Either the engine cowling 218 and electronics box 226 as a complete assembly or the engine cowling 218 and electronics box 226 as individual components may be isolated from engine vibration by the use of known vibration isolators. Therefore, electronic components (power converters, controllers, etc.) and electrical connections are not subjected to the same vibration as the engine. This minimizes the potential for electrical short-circuiting and maximizes protection against fasteners vibrating loose. The electronics box is typically enclosed with a sealed box cover plate 239 to protect the electrical components from the environment.

In the currently preferred embodiment, three-phase power is produced in a single circuit 801. Therefore, three MOSFETS 804 are used. Other rectification approaches are possible.

Figure 10:
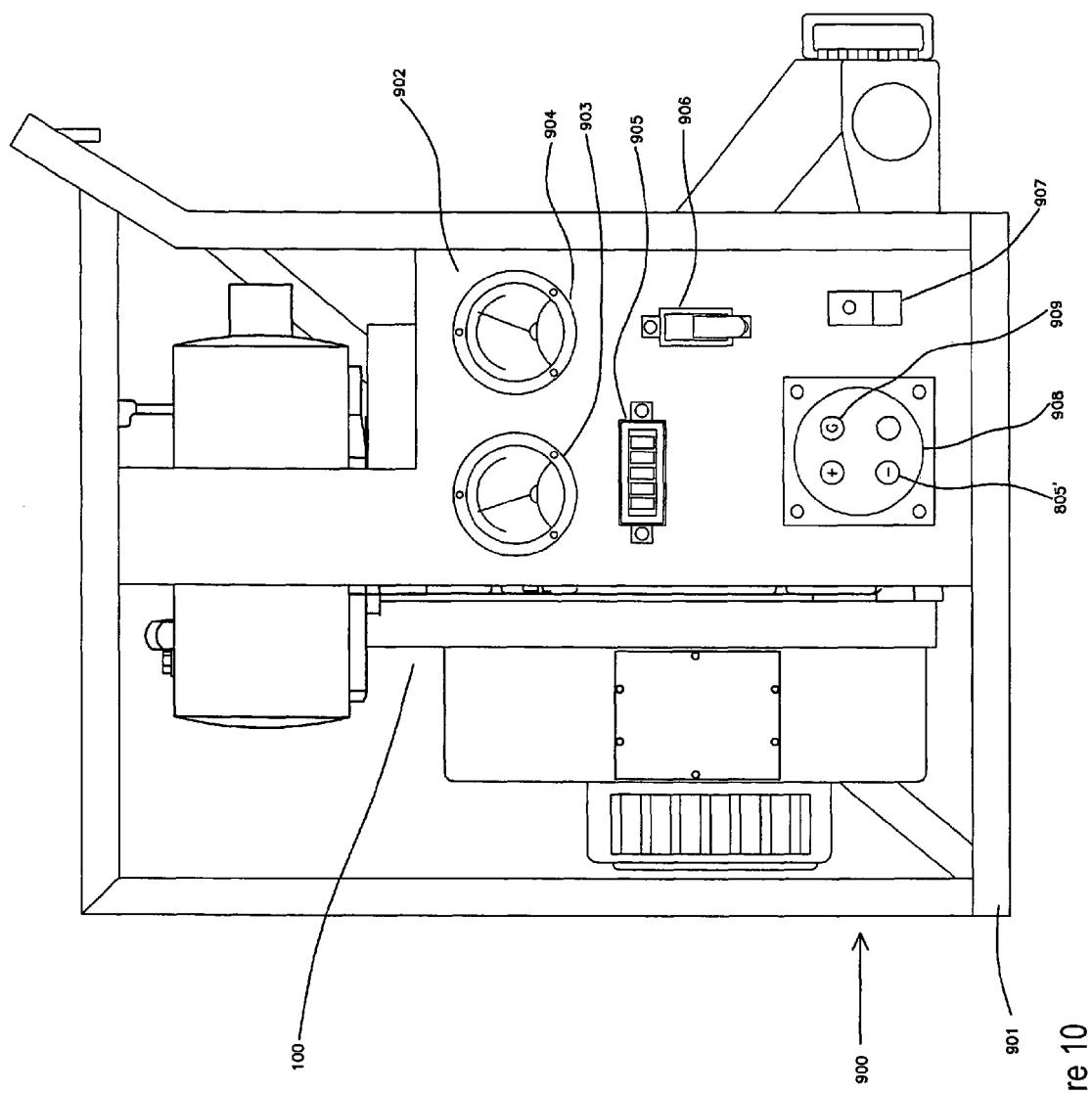
FIG. 10 is an elevational view of the electrical generator mounted in a backpack assembly.

Generator sets as described herein can be produced as stand-alone units for applications requiring minimum weight. For instance a 2 kW, 28 VDC electric generator 100 has a dry weight of 48 lbs. Alternatively, the generator can be packaged in a frame. Two basic frame types are available; however, anyone skilled in the art will readily appreciate that other packaging configurations are possible. FIG. 10 shows a 2-kW, 28-VDC, backpack mounted generator 900 that has a dry weight of 65 lbs. Due to the tremendous weight savings of the invention, generators using compression ignition engines can be made small and light enough to be transported by a single person. Previously, in the 2-kW size range, this was not possible. The generator 100 can be hard mounted to the backpack frame 901 for extra rigidity during transport or it can be soft mounted to isolate engine vibration from the frame. An instrumentation panel 902, which can include gages such as a voltmeter 903, an ammeter 904, and an hour meter 905, is mounted on the frame. Circuit load protection 906 and a ground stud terminal 907 are typically included. A power receptacle 908 is provided that allows users to connect to the power terminals 805' and instrument ground terminal 909. The power receptacle 908 can be of the circular connector type shown in the figure or any other terminal connector style. The output power of backpack generators of this type can be up to approximately 5 kW.

Figure 11:
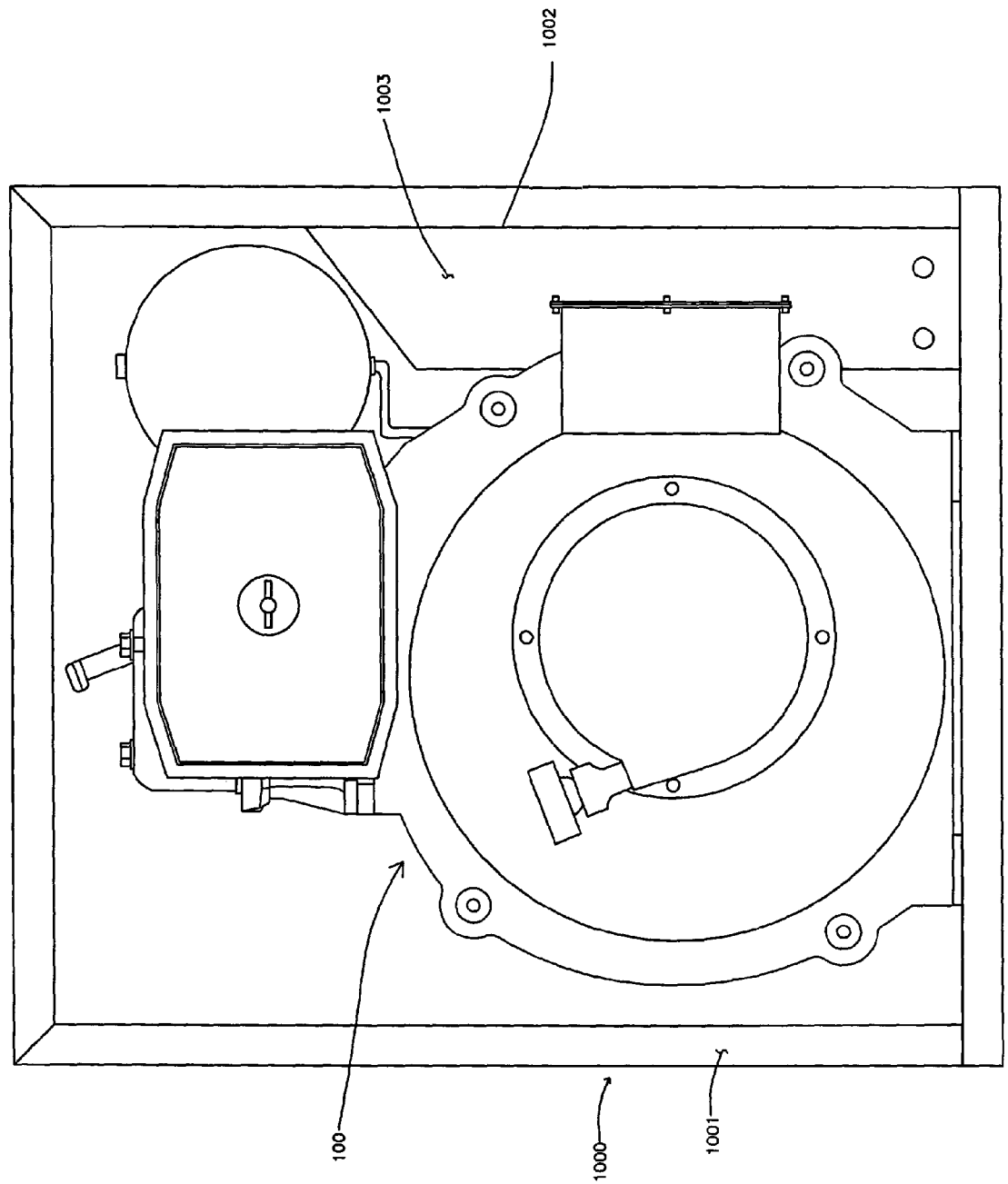
FIG. 11 is an elevational view of the electrical generator mounted in a rollcage assembly.

FIG. 11 shows one embodiment of a 2-kW, 28-VDC, roll-cage mounted generator 1000 that has a dry weight of 63 lbs. In this case, the generator 100 is either hard or soft mounted into a rollcage frame 1001. Again, an instrument panel 1002 is typically included. A sealed instrument cover 1003 is typically included to protect the electronics from the environment. Both packaged configurations can optionally contain an on-board fuel tank or can have fuel fed from a line connecting an external fuel source. The output power of rollcage mounted generators of this type can be up to approximately 15 kW.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. An electrical power supply system, comprising an engine-driven generator configured to output only electrical power as needed, an alternator/starter operatively connected with the engine of the engine-driven generator, a rechargeable power storage device associated with the alternator/starter so as to constitute the only power source for an engine starting function and the only power storage device between the alternator/starter and an electrical load, and a control device operatively arranged between the alternator/starter and the power storage device for switching the alternator/starter between an alternator function and the engine-starting function such that the power storage device is the sole output power source to the electrical load up to a first power demand of the electrical load without starting the engine and thereafter at a second power demand of the electrical load higher than the first power demand the power storage device supplies power to the alternator/starter for the engine starting function whereupon the engine then starts to recharge the power storage device and through the power storage device to provide power to the electrical load.

2. The system of claim 1, wherein the rechargeable power storage device is a rechargeable DC power source such that the engine starting function is selectively startable by energy flow from the rechargeable DC power source to the alternator/starter and thereafter the energy flow is from the generator to the rechargeable DC power source.

3. The system of claim 2, wherein DC power supplied by the DC power source is converted to AC power for starting the engine and AC power generated by the engine-driven generator is converted to DC power for recharging the rechargeable DC power source.

4. The system of claim 2, wherein the rechargeable DC power source comprises at least one source connected as a single power source.

5. The system of claim 2, wherein the rechargeable DC power source is sized to provide one of necessary power surge capacity and load leveling.

6. The system of claim 1, wherein the engine is an internal combustion engine.

7. The system of claim 1, wherein the alternator/starter is a permanent magnet alternator/starter.

8. The system of claim 7, wherein the alternator/starter is a radial gap, twelve-pole alternator/starter.

9. The system of claim 2, further comprising electronics for converting alternating current produced by the alternator/starter into direct current for recharging the DC power source and for converting direct current from the DC power source used in the engine starting function into alternating current for use by the alternator/starter.

10. The system of claim 9, wherein the alternator/starter is configured to produce three-phase power.

11. The system of claim 4, wherein the electrical load and DC energy flow from the generator are wired to common positive and negative terminals of the DC power source.

12. The system of claim 11, wherein the rechargeable DC power source is sized to provide at least one of transient power required for starting inductive loads and load leveling.

13. The system of claim 1, wherein the control device is configured to cause the rechargeable power storage device to automatically start the engine associated with the generator when a sensed power storage device voltage drops below a predetermined value to indicate the occurrence of the second power demand.

14. The system of claim 1, wherein the control device includes a current sensor so that an engine associated with the generator is automatically stopped when sensed alternator/starter output current flow drops below as predetermined value.

15. The system of claim 14, wherein the predetermined value is at least equal to or greater than 0% of maximum total current capacity of a power storage device.

16. The system according to claim 1, wherein the alternator/starter is configured to be turned of during running of the engine when a power demand from at least one of the power storage device and the electrical load is negligible.

* * * * *